United States Patent
Toyohara et al.

(10) Patent No.: US 6,646,060 B1
(45) Date of Patent: Nov. 11, 2003

(54) RESIN COMPOSITION CONTAINING CRYSTALLINE POLYIMIDE

(75) Inventors: Kiyotsuna Toyohara, Yamaguchi (JP); Toyoaki Ishiwata, Yamaguchi (JP); Daisuke Ozaki, Yamaguchi (JP); Jiro Sadanobu, Yamaguchi (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/743,408

(22) PCT Filed: May 10, 2000

(86) PCT No.: PCT/JP00/02976

§ 371 (c)(1),
(2), (4) Date: Jan. 10, 2001

(87) PCT Pub. No.: WO00/68318

PCT Pub. Date: Nov. 16, 2000

(30) Foreign Application Priority Data

| May 10, 1999 | (JP) | 11-128411 |
| May 26, 1999 | (JP) | 11-146325 |
| Jun. 7, 1999 | (JP) | 11-159196 |
| Jun. 8, 1999 | (JP) | 11-160773 |
| Jun. 17, 1999 | (JP) | 11-171024 |
| Dec. 14, 1999 | (JP) | 11-354357 |

(51) Int. Cl.$^7$ ............................................. C08G 69/48
(52) U.S. Cl. ..................... 525/425; 525/436; 428/473.5; 360/3
(58) Field of Search ................................. 525/425, 436; 428/473.5; 360/3

(56) References Cited

U.S. PATENT DOCUMENTS

| 4,141,927 A | 2/1979 | White et al. |
| 4,358,562 A | 11/1982 | Paschke et al. |
| 4,417,045 A | 11/1983 | Nimry et al. |
| 4,725,647 A | 2/1988 | Maresca et al. |
| 5,037,946 A | 8/1991 | Morris et al. |
| 5,057,595 A | 10/1991 | Morris et al. |
| 5,366,663 A | 11/1994 | Römer et al. |
| 5,378,420 A | * 1/1995 | Harris et al. ................. 264/184 |
| 5,395,917 A | 3/1995 | Irwin |
| 5,599,658 A | 2/1997 | Greener et al. |
| 5,633,319 A | 5/1997 | Silvi et al. |
| 5,677,394 A | * 10/1997 | Bohme et al. ................ 525/174 |
| 6,103,806 A | * 8/2000 | Kido et al. .................. 524/449 |
| 6,114,472 A | * 9/2000 | Matsuki et al. ............. 172/342 |

FOREIGN PATENT DOCUMENTS

| EP | 0 430 640 A | 6/1991 |
| EP | 0 518 571 A | 12/1992 |
| EP | 0 522 649 A | 1/1993 |
| EP | 0 793 219 A | 9/1997 |
| EP | 900828 | 3/1998 |
| EP | 0 900 828 A | 3/1999 |
| EP | 0 985 701 A | 3/2000 |
| EP | 1 113 045 A | 7/2001 |
| JP | 62-185713 | 8/1987 |
| JP | 5-25370 | 2/1993 |
| JP | 9-132691 | 5/1997 |
| JP | 9-272799 | 10/1997 |

OTHER PUBLICATIONS

Patent Abstracts of Japan machine translation for 06–049206, Feb. 22, 1994, DSM, "Polyimide, It's Polymer Blend and Polyimide–Containing Article".*

Charrier, Jean–Michel, "Polymeric Materials and Processing Plastics, Elastomers, and Composites", Hanser Publishers: New York, 1991.*

Derwent WPI, Abstract, JP 59–37161 "Heat–resistant polyester–based container, molded from non–orientated non–crystalline sheet of PET (co)polymer, polypolyethermide and additives", Feb. 29, 1984.

Journal of Applied Polymer Science, vol. 48, 935–937 (1993), John Wiley & Sons, Inc., "Miscibility of Poly(ether imide) and Poly(ethylene terephthalate)".

Macromolecules 1995, 28, 2845–2851, H. Chen, "Miscibility and Crystallization Behavior of Poly(ethylene terephthalate)/Poly (ether imide) Blends".

Antec 1995, J. Kim, M. Cakmak, "Necking Behavior and Structure Development in Uni and Biaxially Stretched Poly-(Ethylene Naphthalate)/Poly(Ether Imide) Blend Films".

Polymer, vol. 36, No. 23, 1995, N. Kinami, T. Okuyama, M. Okamoto, T. Inoue, "UCST–type phase behavior in poly-(ethylene terephthalate–co–ethylene naphthalate)/poly(ether imide) blends".

(List continued on next page.)

Primary Examiner—James J. Seidleck
Assistant Examiner—Melanie Bissett

(57) ABSTRACT

A resin composition containing a mixture produced by blending a crystalline polyamide expressed e.g. by formula (1)

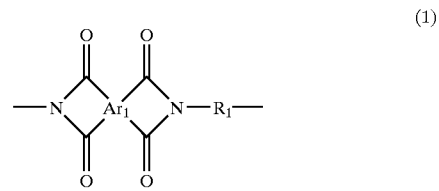

(1)

(in the formula, $R_1$ is a bivalent organic aromatic group or aliphatic group having a carbon number of 2 to 30, optionally having substituent and optionally containing non-reactive groups such as ether group and aromatic group in the main chain, and $Ar_1$ is an aromatic residue having a carbon number of 6 to 45 and optionally having substituent) with a thermoplastic polyester. The resin composition has excellent mechanical characteristics such as high elastic modulus, flow properties and heat-resistance and is suitable as a material for an electronic part for surface mounting.

24 Claims, No Drawings

OTHER PUBLICATIONS

Research Disclosure, Nov. 1987, "Poly(Ethlene Naphthalenedicarboxylate)/Polyetherimide Blends".

Patent Abstracts of Japan, JPA 7–2287641, Aug. 29, 1995, Kinami, et al., "Polyester Resin Composition and its Molding".

Patent Abstracts of Japan, JPA 6–049206, Feb. 22, 1994, Koning, et al., "Polyimide, Its Polymer Blend and Polymide– Containing Article".

Patent Abstracts of Japan, JPA 10–330604, Dec. 15, 1998, Matsuki, et al., "Polyalkylene Naphthalate Resin Composition".

ACS Polym. Prep., 1994, 35(1), Y. Imai, "High Pressure Synthesis of Highly Crystalline Polyimides and Polybenzoxazole Directly From Their Monomeric Reactants".

Macromolecules 1994, 27, 4101–4105, K. Itoya, Y. Kumagai, M. Kakimoto, Y. Imai, "High Pressure Synthesis of Aliphatic Polyimides via Salt Monomers Composed of Aliphatic Diamines and Oxydiphthalic Acid".

Macromolecules 1995, 28, 6368–6370, T. Inoue, M. Kakimoto, Y. Imai, "First Observation of a Thermotropic Liquid Crystal in a Simple Polyimide Derived from 1,11–Diaminoundecane and 4,4"–Terphenyltetracarboxylic Acid.

Macromol, Chem. Phys. 198, 519–530 (1997), T. Inoue, M. Kakimoto, Y. Imai, J. Watanabe, "Synthesis of simple main–chain type polyimides derived from aliphatic diamines and 4,4"–Terphenyltetracarboxylic acid, and their thermotropic liquid crystalline behavior.

Macromolecules, 1997, 30, 1921–1928, T. Inoue, Y. Kumagai, M. Kakimoto, Y. Imai, J. Watanabe, "High–Pressure Synthesis and Properties of Aliphatic–Aromatic Polyimides via Nylon–Salt–Type Monomers Derived from Aliphatic Diamines with Pyromellitic Acid and Biphenyltetracarboxylic Acid".

Journal of Polymer Science, Part A: Polymer Chemistry, vol. 36, 39–47 (1998), M. Goyal, T. Inoue, M. Kakimoto, Y. Imai, "High–Pressure Synthesis and Properties of Aliphatic–Aromatic Polyimides via Nylon–Salt–Type Monomers Derived from Aliphatic Diamines and Benzophenonetetracarboxylic Acid".

Yoshihiko Aihara, et al, "Zone Drawn NEW–TPI Thermoplastic Polyimide and Its Blends with Xydar Liquid Crystalline Polymer," *Polymer Engineering and Science*, Aug. 1994, vol. 16, pp. 1275–1286.

* cited by examiner

RESIN COMPOSITION CONTAINING CRYSTALLINE POLYIMIDE

TECHNICAL FIELD

The present invention relates to a thermoplastic resin composition composed mainly of a crystalline polyamide and a thermoplastic polyester. More particularly it relates to a polyamide/polyester-based thermoplastic resin composition having excellent heat-resistance, mechanical characteristics such as mechanical strength and elastic modulus and/or moldability such as the fluidity in molding and usable as a molded article such as an electronic part suitable for surface mounting and a film.

BACKGROUND ARTS

A surface-mounting process using a surface-mounting technology (SMT) is being spreading in the field of electronic parts. Furthermore, improvement on the mechanical strength, moldability and heat-resistance has been required for a resin for surface-mounting electronic parts because of the miniaturizing and thinning tendency of electronic parts and the exposure of the material for electronic part such as connector to severe temperature condition compared with conventional mounting process by the adoption of soldering process.

To meet the requirement, the application of a polyamide resin such as nylon 6 resin and nylon 66 resin; a semi-aromatic polyester resin such as polyethylene terephthalate (PET) and polybutylene terephthalate (PBT); a polyphenylene sulfide resin and an aromatic polyamide resin has been investigated.

However, these resins have excellent mechanical strength and fluidity but poor heat-resistance or excellent heat-resistance but poor mechanical strength and fluidity and, accordingly, there is considerable restriction on the industrial use of these resins.

In regard to heat-resistance, it is known that an amorphous polyether imide (e.g. ULTEM100, product of GE) is compatible with PET to increase the glass transition temperature (Tg) of PET (e.g. specifications of U.S. Pat. No. 4,141,927; JP-B 3-58384; J. Appl. Polym. Sci. (1993) vol.48, p.$^{935}$; Polymer Bulletin (1994) vol.33, p.113; Macromolecules (1995) vol.128 2845), etc.). There are similar reports on the polymer blend of the amorphous polyether imide and PBT (e.g. specification of U.S. Pat. No. 4,141,927). Similar reports are also found on the polymer blend of the amorphous polyether imide and polyethylene-2,6-naphthalenedicarboxylate (PEN) (e.g. ANTEC 1995 p.1453–1458; Polymer Vol.36, Number 23 1995 p.4449; RESEARCH DISCLOSURE 1987 p.677; JP-A 7-228761).

However, the blending of the above-mentioned ULTEM and a polyester is generally difficult owing to the large difference between their melt viscosity values reflecting their Tg difference. Accordingly, it is necessary to increase the mixing efficiency by the use of an extruder, etc., and mix both resins at a high temperature for a long period to achieve homogeneous mixing of both resins. Such method has problems of e.g. causing thermal deterioration of the polymer.

Specification of JP-A 51-143060 discloses a polymer blend containing a specific polyether imide and a specific polyester. The polymer blend has a melt viscosity lower than that of polyether imide, however, a slight improvement on the mechanical strength is found only at a polyether imide content of 90% by weight or more and the improving effect is insufficient.

Specification of JP-A 59-37161 discloses a heat-resistant polyester container formed of a non-oriented amorphous sheet made of a resin composition composed of 60 to 99% by weight of PET and 40 to 1% by weight of a polyether imide. The polyether imide disclosed in the above specification is same as the one described in the specification of the above-mentioned JP-A 51-143060, and there is no description on the improvement of mechanical properties.

A polyimide composed of the monomer unit of 3,3',4,4'-benzophenonetetracarboxylic acid dianhydride and the monomer unit of 1,4-diaminobutane and a polymer blend of the polyimide and a thermoplastic polymer including PET and PBT are disclosed in the specification of JP-A 6-49206, however, there is no description on the improvement of the mechanical strength of such polymer blend. The Tg of the polymer blend is increased owing to high Tg of ULTEM1000, and the molding becomes difficult owing to the increased melt viscosity. The produced molded article is brittle and there is no improvement on the delamination trouble of a film caused by bending the film to apply a stress.

A resin composition containing a copolymerized polyester composed of 4,4'-biphenyldicarboxylic acid as the acid component and 1,4-cyclohexane dimethanol and ethylene glycol as the glycol component in combination with a modifier (for example, ULTEM of GE) is disclosed in the specification of U.S. Pat. No. 5,057,595.

The specification of U.S. Pat. No. 5,037,946 discloses a resin composition containing a copolymerized polyester composed of 4,4'-biphenyldicarboxylic acid as the acid component and 1,6-hexanediol and ethylene glycol as the glycol component in combination with a modifier similar to the above.

The specification of JP-A 10-330604 discloses that the crystallinity, melt-formability, weather resistance and delamination resistance can be improved by blending a polyimide having low-Tg and composed of specific repeating units to a polyalkylene naphthalate, however, the improvement is insufficient because there is no improvement of the mechanical properties.

Furthermore, all of the descriptions of these specifications of JP-A 51-143060, JP-A 59-37161, JP-A 6-49206, U.S. Pat. No. 5,057,595, U.S. Pat. No. 5,037,946 and JP-A 10-330604 relate to a polymer blend produced by using amorphous polyimide or polyether imide, and lack the description or suggestion of the crystalline polyimide of the present invention.

Melt polymerization, solution polymerization, solid-phase polymerization, interfacial polymerization, etc., are known as the methods for the production of a polyimide. Among the above methods, the hydrolysis of a polyamic acid and the imidation reaction competitively proceed in either of the method to imidate by thermal cyclization and the method to imidate by chemical cyclization and, accordingly, polyimide having sufficiently high polymerization degree cannot be produced.

Reaction of a tetracarboxylic acid dianhydride with a diisocyanate is also known as a process for the production of a polyimide, however, it is difficult to synthesize the objective polymer in high polymerization degree because diisocyanate is expensive and extremely unstable.

Another known method for the production of a semi-aromatic polyimide is the reaction of a salt composed of an aliphatic diamine and an aromatic tetracarboxylic acid or a salt composed of an aliphatic diamine and an aromatic tetracarboxylic acid dialkyl ester under high pressure (ACS Polym. Prep. 1994 35(1), Macromolecules 1994, 27, 4101–4105, Macromolecules 1995, 28, 6368–6370, Macromol, Chem. Phys. 198, 519–530 (1997), Macromolecules 1997, 30, 1921–1928, Journal of Polymer Science: Part A: Polymer Chemistry, Vol.36, 39–47 (1998), etc.), however, the polymerization degree represented by $\eta_{inh}^c$ (dL/g) of the produced semi-aromatic polyimide is 0.45 to 2.89 or thereabout and a polyimide having high polymerization degree cannot be produced.

The object of the present invention is to provide a thermoplastic resin composition composed of a crystalline polyimide and a thermoplastic polyester and having excellent heat-resistance, moldability and/or mechanical properties such as high elastic modulus and Izod impact strength and provide its production process.

Another object of the present invention is to provide a molded article such as a surface-mounting electronic part and a film produced by using the above thermoplastic resin composition.

The other object of the present invention is to provide a crystalline polyimide having high polymerization degree and usable as the above crystalline polyimide and provide its production process.

As a result of vigorous investigation by the inventors to achieve the above objects, it has been found that the objects can be achieved by blending a crystalline polyimide with a thermoplastic polyester in a manner to compatibilize said polyimide with said polyester at least in molten state.

DISCLOSURE OF THE INVENTION

The present invention comprises a thermoplastic resin composition containing a crystalline polyimide and a thermoplastic polyester wherein said polyimide and said polyester are compatibilized at least in molten state, a process for the production of the thermoplastic resin composition, and a molded article produced by using the thermoplastic resin composition.

Further, the present invention comprises a modification process for improving the mechanical characteristics of a thermoplastic polyester by mixing the thermoplastic polyester with a crystalline polyimide in a manner to compatibilize said polyimide with said polyester at least in molten state.

Furthermore, the present invention comprises a crystalline polyimide having high polymerization degree represented by the intrinsic viscosity ([η]) of 2.5 (dl/g) or above and 15.0 or below and its production process.

BEST MODE FOR CARRYING OUT THE INVENTION

Crystalline Polyimide

The crystalline polyimide of the present invention includes a semi-aromatic polyimide crystallizable by various crystallization treatments, to say nothing of a semi-aromatic polyimide crystallizable e.g. by cooling from molten state. There is no particular restriction on the crystallization treatment, and concrete examples of the treatment are the heat-treatment at or above Tg, the recrystallization or reprecipitation from a solution, and the addition of a plasticizer or a crystallization agent such as nucleation agent. Two or more of the above treatments may be used in combination.

Concrete examples of such crystalline polyimide are one or more kinds of semi-aromatic polyimides containing the repeating unit of the following formula (1)

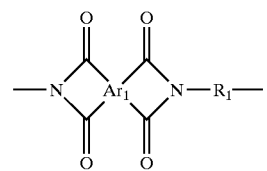

(in the formula, $R_1$ is a bivalent organic aromatic group or aliphatic group having a carbon number of 2 to 30 and optionally containing substituent, and $Ar_1$ is an aromatic group having a carbon number of 6 to 45 and optionally containing substituent) as a main component.

The group $R_1$ in the above formula (1) is a bivalent organic aromatic group or aliphatic group having a carbon number of 2 to 30 and optionally having substituent, and may contain a non-reactive group such as an ether group or an aromatic group in the main chain, preferably a bivalent organic aromatic group or aliphatic group having a carbon number of 6 to 30 and optionally having substituents. Two or more kinds of the group $R_1$ may be used in combination.

The substituent of the group $R_1$ is a group non-reactive with polyesters, for example, an alkyl group having a carbon number of 1 to 6, an alkoxy group having a carbon number of 1 to 6 and a halogen atom. As the alkyl group of these substituents, a straight or branched alkyl group such as methyl, ethyl, n- or iso-propyl, n-, sec-, or tert-butyl, pentyl, hexyl group is exemplified.

When the above group $R_1$ is an organic aromatic group, such $R_1$ group is for example a bivalent organic aromatic group having a carbon number of 6 to 30 and optionally containing a non-reactive group such as ether group or an aromatic group (phenyl group) in the main chain. Concretely, the groups expressed by the following formulas (1-a) can be cited as preferable examples.

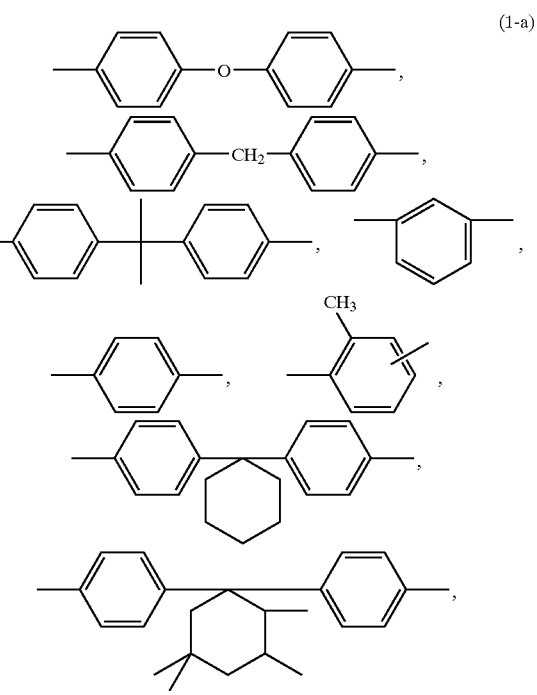

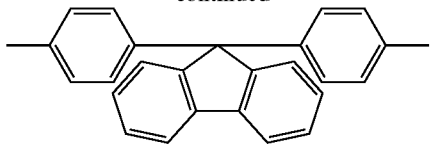

Among the above groups, a group derived from m-phenylenediamine and expressed by the following formula (1-b) is especially preferable.

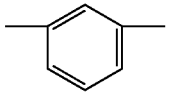

(1-b)

The aliphatic group having a carbon number of 2 to 30 is for example an aliphatic group having a carbon number of 2 to 30 and optionally containing a non-reactive group such as ether group and an aromatic group (phenyl group) in the main chain. Concrete examples of the group are aliphatic alkylene group and alicyclic alkylene group induced from the following diamine compound or diisocyanate compound and capable of forming an imide bond.

Examples of the aliphatic alkylene group are 2,2,4- or 2,4,4-trimethylhexamethylenediamine, ethylenediamine, trimethylenediamine, tetramethylenediamine, pentamethylenediamine, hexamethylenediamine, octamethylenediamine, nonanediamine, decamethylenediamine, undecamethylenediamine, dodecamethylenediamine, bis(3-aminopropyl)ether, 1,2-bis-(3-aminopropoxy)ethane, 1,2-bis-(3- aminopropoxy)butane, 1,3-bis-(3-aminopropoxy)-2,2-dimethylpropane, α, ω-bis-(3-aminopropyl)diethyleneglycol ether, p-xylylenediamine, m-xylylenediamine, 4,4'-bis(aminomethyl)biphenyl or a group produced by substituting the diamine with diIsocyanate (for example, isophorone diisocyanate).

Examples of the alicyclic alkylene group are isophoronediamine, cyclohexanediamine and 1,8-diamino-p-menthane.

Aliphatic alkylene groups expressed by $—(CH_2)_n—$ (n represents an integer of 6 to 18) are preferable among the above examples. More preferable groups among the above groups are aliphatic alkylene groups having an n-value of 6 or more and derived from hexamethylenediamine, octamethylenediamine, nonanediamine, decamethylenediamine, undecamethylenediamine or dodecamethylenediamine because these groups give a polyimide having a melting point falling within a preferable range relative to the decomposition point of the semi-aromatic polyester, sufficiently soluble in blending and free from the action to lower the crystallinity. On the other hand, a polyimide derived from an aliphatic alkylene group having an n-value of 4 has relatively high crystallinity, however, the blending of the polymer is difficult owing to its high melting point. The alkylene groups having an n-value of 9 to 12 are preferable above all, and an aliphatic alkylene group derived from dodecamethylenediamine is especially preferable.

The group $Ar_1$ in the above formula (1) is an aromatic residue having a carbon number of 6 to 18 and optionally having substituents. Substituents cited in the above group $R_1$ can be used as the substituents of the group $Ar_1$.

$Ar_1$ is preferably an aromatic group having a carbon number of 6 to 18 and optionally having substituents. More preferably, concrete examples of preferable group $Ar_1$ are aromatic residue selected from the following formula (1-c)

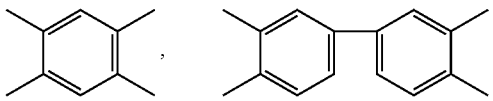

(1-c)

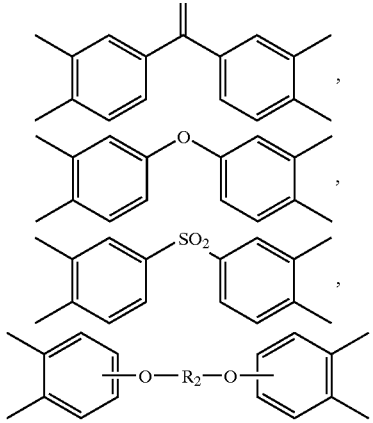

(in the formula, the definition of $R_2$ is same as $R_1$ of above formula (1)).

Although the definition of $R_2$ is same as that of $R_1$, the group $R_2$ is preferably expressed by the above formulas (1-a) and (1-b) or $—(CH_2)_n—$ (n is an integer of 2 to 30).

Above all, a group derived from pyromellitic anhydride and expressed by the following formula (1-d) is especially preferable as the group Ar1.

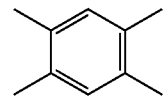

(1-d)

The preferable combinations of $R_1$ and $Ar_1$ in the above formula (1) in the crystalline polyimide of the present invention are the case that $R_1$ is an aliphatic alkylene group having a carbon number of 6 to 18, especially 9 to 12 and optionally containing substituents and $Ar_1$ is an aromatic group having a carbon number of 6 to 18, expressed by the above formula (1-c) and optionally containing substituents, especially a group derived from pyromellitic anhydride and expressed by the above formula (1-d).

Accordingly, the polyimide to be used in the present invention is preferably a polyimide composed of the repeating unit obtained from an aliphatic diamine and pyromellitic anhydride and expressed by the following formula (1-e)

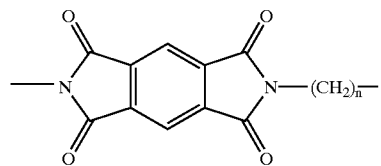

(1-e)

(in the formula, n is an integer of 9 to 12) and especially preferably a crystalline semi-aromatic polyimide composed of two or more kinds of these repeating units. The term "semi-aromatic" means that the whole or a part of the diamine component and/or a part of the tetracarboxylic acid component are aromatic groups.

Only one kind or two or more kinds of the above polyimide may be used as the polyimide in the thermoplastic resin composition of the present invention (which may be abbreviated as "the composition" hereafter). For example, in the case of a crystalline semi-aromatic polyimide composed of a combination of two or more kinds of the repeating units expressed by the above formula (1-e), decanediamine and hexamethylenediamine or decanediamine and dodecamethylenediamine are used as the main diamine component constituting the crystalline polyimide. In the case of using these diamines in combination, the mixing ratio may be arbitrarily selected. Pyromellitic acid is used as the main tetracarboxylic acid component.

The polyimide may contain plural copolymerized components, which may be used as a diamine component, a tetracarboxylic acid component or a combination of both components.

The diamine component to be copolymerized is for example an alkylenediamine such as ethylenediamine, trimethylenediamine, tetramethylenediamine, pentamethylenediamine, hexamethylenediamine, octamethylenediamine, nonanediamine, decamethylenediamine, undecamethylenediamine, dodecamethylenediamine, tridecamethylene-diamine and tetramethylhexanediamine, an aliphatic diaminoether such as 1,12-(4,9-dioxa)dodecamethylenediamine, 1,8-(3,6-dioxa)octamethylene-diamine and jeffamine and a diamine containing alicyclic hydrocarbon group such as cyclohexanediamine and isophoronediamine, and these examples do not restrict the scope of the present invention.

An aromatic tetracarboxylic acid, an aliphatic tetracarboxylic acid, etc., can be used as the tetracarboxylic acid component to be copolymerized. Examples of the tetracarboxylic acid components are those derived from benzophenonetetracarboxylic acid, biphenyltetracarboxylic acid, bis(dicarboxyphenyl)propane, 4,4'-[2,2,2-trifluoromethyl] ethylidene]bis(1,2-benzenedicarboxylic acid), bis(dicarboxyphenyl)sulfonic acid, bis(dicarboxyphenyl)ether, thiophenetetracarboxylic acid, naphthalenetetracarboxylic acid, 1,2,3,4-butanetetracarboxylic acid, cyclopentanetetracarboxylic acid, 5(2,5-dioxotetrahydrofuryl) 3-methyl-3-cyclohexene-1,2-dicarboxylic acid, etc.

Especially preferable polymer is a copolymer produced by using decamethylenediamine and hexamethylenediamine as the diamine component and pyromellitic dianhydride as the tetracarboxylic acid component because the polymer has lowered melting point without decreasing the crystallinity and is producible at a reduced cost. The preferable copolymerization ratio of hexamethylenediamine is 10 to 40 mol % based on the total diamine. These copolymerizing components may be used singly or in combination of two or more components.

There is no particular restriction on the copolymerization ratio unless the produced copolymer is not deviated from the object of the present invention, and the constituent units other than the above-mentioned units can be used at a ratio smaller than 50 mol % based on the amine component or tetracarboxylic acid component in the total polyimide. When the melting point (Tm) of the produced polyimide is below 200° C., the use of said thermoplastic resin composition for surface-mounting use becomes difficult and, accordingly, the copolymerization is preferably carried out at a composition containing increased amount of the above alkylene pyromellitimide unit, more preferably a composition containing the above alkylene pyromellitimide unit in an amount of 70 mol % or more.

The melting point Tm of the crystalline polyimide of the present invention is preferably 200° C. or above, especially 250° C. or above for the application to the surface-mounting use.

There is no particular restriction on the molecular weight of the crystalline polyimide to be used in the present invention. When the addition amount of the crystalline polyimide is small, the molecular weight of the polyimide may be low to an extent not to deteriorate the mechanical properties of the molded article, however, the molecular weight of the polyimide is preferably high within a range not to deteriorate the moldability when the addition amount is large. Generally, the intrinsic viscosity ($[\eta]$) of the crystalline polyimide is preferably between 0.5 and 15 determined by dissolving the polyimide in a mixture of p-chlorophenol/tetrachloroethane (weight ratio, 60/40) and measuring the viscosity at 35° C. and a polymer concentration of 0.5 g/dl. The intrinsic viscosity of smaller than 0.5 is sometimes insufficient for improving the mechanical strength. The intrinsic viscosity exceeding 15 is unpreferable because the mixing of both components becomes difficult owing to too large melt viscosity difference between the crystalline polyimide, especially crystalline polyimide having high polymerization degree and the thermoplastic polyester.

Above all, the intrinsic viscosity of the polyimide is preferably 0.5 or above and smaller than 2.5 (dl/g) to develop good moldability and high heat-resistant effect caused by the high crystallinity of the resin composition and preferably 2.5 or above and 15 or below to exhibit the improving effect on the mechanical properties caused by the molecular entanglement.

A crystalline polyimide produced by any process such as melt-polymerization, solution polymerization, solid-phase polymerization or interfacial polymerization can be used in the present invention. Prevailing methods are, for example, (1) the reaction of a tetracarboxylic acid dianhydride with a diamine in a solvent followed by the thermal or chemical cyclization of resultant polyamic acid using acetic anhydride and pyridine, (2) the thermal dehydrative cyclization of said polyamic acid, (3) the dehydrative polymerization of a tetracarboxylic acid dianhydride and a diisocyanate under heating, and (4) the dealcoholating cyclization by the reaction of a tetracarboxylic acid di- or tetraester with a diamine.

The inventors of the present invention have found that a crystalline polyimide having high polymerization degree with intrinsic viscosity of 2.5 to 15 (dl/g) can be produced by the solid phase polymerization of a crystalline polyimide having low polymerization degree (or medium polymerization degree) with intrinsic viscosity of 0.05 to 4.5 (dl/g).

The polymerization degree of the crystalline polyimide having high polymerization degree in the present invention is represented by the intrinsic viscosity of 2.5 to 15. When the intrinsic viscosity is smaller than 2.5, the development of the physical properties of the polyimide by the increase of polymerization degree is ineffective and sufficient mechanical properties are not expectable. When the intrinsic viscosity exceeds 15, the solution viscosity becomes extremely high to deteriorate the moldability of the resin. The more preferable range of the intrinsic viscosity is 4.5 to 9.

The crystalline polyimide having high polymerization degree may contain additives as necessary similar to the crystalline polyimide of the present invention. Examples of the additives are various fillers such as talc, calcium carbonate, mica, clay, titanium oxide, aluminum oxide, glass flake, metal flake, metal powder, glass fiber, metal fiber, aramid fiber and ceramic fiber, heat-stabilizer represented by phosphoric acid ester and phosphorous acid ester, light stabilizer, ultraviolet absorber, lubricant, flame-retardant, flame-retarding assistant, plasticizer, crystal nucleation agent, etc., polyesters represented by PET and PEN, and other polymers. The addition amount depends upon the purpose of the additive and is not particularly restricted, however, preferable amount is about 0.1 to 15% for various stabilizers, about 0.1 to 15% for nucleation agents, plasticizers, etc., about 1 to 60% for other reinforcing agents and about 5 to 40% for flame retardants.

The crystalline polyimide having low polymerization degree (or medium polymerization degree) to be used in the production of a crystalline polyimide of the present invention having high polymerization degree can be produced by conventional process or the process of the present invention and there is no particular restriction on the production process.

The polymerization degree of the crystalline polyimide having low polymerization degree (or medium polymerization degree) corresponds to the intrinsic viscosity of 0.05 to 4.5 (dl/g). When the intrinsic viscosity is lower than 0.05, sufficiently high polymerization rate cannot be attained in solid phase polymerization and the production of crystalline polyimide having high polymerization degree is essentially difficult. The production of a polyimide having an intrinsic viscosity exceeding 4.5 is essentially extremely difficult also by conventional technique. The polymerization degree of the crystalline polyimide having low polymerization degree (or medium polymerization degree) preferably corresponds to the intrinsic viscosity of 0.5 to 4. More preferably, the intrinsic viscosity is 0.8 to 3.5.

Similar to the above-mentioned polyimide having high polymerization degree, the polyimide having low polymerization degree (or medium polymerization degree) may be incorporated with additives as necessary.

The solid phase polymerization in the present invention is carried out by polymerizing a crystalline polyimide of low polymerization degree (or medium polymerization degree) while keeping the polyimide in solid state. The solid phase polymerization can minimize the thermal and/or oxidative deterioration of polymer and smoothly increase the polymerization degree. As a result, a crystalline polyimide having high polymerization degree and excellent color can be produced.

There is no particular restriction on the form of the polyimide having low polymerization degree (or medium polymerization degree) to be used in the solid phase polymerization, and pellet or powder of polyimide can be used for example. The reaction temperature of solid phase polymerization is not lower than Tg and not higher than Tm of the crystalline semi-aromatic polyimide. When the reaction temperature is lower than Tg, the polymerization rate is too slow to effectively obtain a polyimide having high polymerization degree. On the contrary, when the reaction temperature is Tm or above, the polyimide is melted to hinder the solid phase polymerization. The reaction temperature is preferably between Tg+20° C. and Tm−5° C., more preferably Tg+30° C. and Tm−10° C. The solid phase polymerization may be performed under normal pressure or reduced pressure. There is no particular restriction on the kind of atmosphere of the solid phase polymerization system, however, the system is preferably maintained in an atmosphere of an inert gas such as nitrogen or argon. Polymerization in an atmosphere containing oxygen is unpreferable owing to the possibility to cause the deterioration of the obtained polyimide.

As mentioned above, a crystalline polyimide having the desired high polymerization degree is smoothly producible by the solid phase polymerization of a polyimide having low polymerization degree (or medium polymerization degree).

The crystalline polyimide having high polymerization degree is a thermoplastic and/or soluble polymer expectable to enable remarkable improve of various mechanical properties when used in the form of various molded articles such as fiber, film or resin or used as a modifying agent to be blended to other polymer. The production process of the polyimide is suitable for large-scale production at a low cost and, accordingly, the polyimide is extremely useful in various industrial fields.

The crystalline polyimide of the present invention may have blocked terminals. The terminal blocking agents are phthalimide derivatives, monoamine derivatives, alcohols, etc., and properly selectable according to the purpose.

Thermoplastic Polyester

The above crystalline polyimide is blended with a thermoplastic polyester in the present invention.

A thermoplastic polyester having a melting point lower than that of the polyimide or an amorphous polyester can be used as the above thermoplastic polyester, or a polyimide having a melting point lower than the melting point of the polyester to be blended can be used as the crystalline polyimide.

Any thermoplastic polyester can be used for the purpose provided that either one of the main diol component or dicarboxylic acid component constituting said polyester is an aliphatic compound and the other component is an aromatic compound, and especially preferable examples of the polyester is the one composed mainly of a semi-aromatic ester expressed by the formula (2)

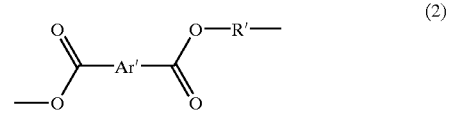

(2)

(in the formula, Ar' is an aromatic group having a carbon number of 6 to 18 and optionally containing substituents, and R' is an aliphatic group having a carbon number of 2 to 20 and optionally containing substituents).

The group Ar' which is an aromatic group having a carbon number of 6 to 18 and optionally containing substituents may contain an ether group in the main chain and is an aromatic dicarboxylic acid component corresponding to the acid component of the polyester and, preferably, an acid component composed mainly of an aromatic dicarboxylic acid having a carbon number of 6 to 18.

Examples of such aromatic dicarboxylic acid are terephthalic acid, isophthalic acid, naphthalenedicarboxylic acid, diphenyldicarboxylic acid, diphenylsulfonedicarboxylic acid, diphenyl ether dicarboxylic acid, diphenoxyethanedicarboxylic acid, methylterephthalic acid, methylisophthalic acid, chloroterephthalic acid and nitroterephthalic acid. More preferably, the main acid component of the polyester is terephthalic acid, isophthalic acid or naphthalenedicarboxylic acid, especially preferably terephthalic acid or naphthalenedicarboxylic acid. Two or more kinds of the above dicarboxylic acid components may be used in combination.

The group R' which is an aliphatic group having a carbon number of 2 to 20 and optionally containing substituents corresponds to the diol component constituting the polyester and preferably has 2 to 20 carbon atoms. Examples of the group are aliphatic glycols such as ethylene glycol, diethylene glycol, trimethylene glycol, tetramethylene glycol, pentamethylene glycol, neopentyl glycol, hexamethylene glycol, octamethylene glycol, decamethylene glycol and dodecamethylene glycol; alicyclic glycols such as 1,4-cyclohexylenedimethanol, 1,1-cyclohexanedimethanol and 1,4-cyclohexanedimethanol; polyglycols such as diethylene glycol, triethylene glycol, polyethylene glycol and polytetramethylene glycol; and aromatic dihydroxy compounds such as hydroquinone, methylhydroquinone, butylhydroquinone, amylhydroquinone, resorcinol, 2,2-bis (4-hydroxyphenyl)propane [bisphenol A], 1,1-bis(4-hydroxyphenyl)cyclohexane [bisphenol Z], bis(4-hydroxyphenyl ether) and bis(4'-β-hydroxyethoxyphenyl) sulfonic acid. More preferably, the main glycol component is ethylene glycol, trimethylene glycol, tetramethylene glycol, pentamethylene glycol or hexamethylene glycol, especially preferably ethylene glycol, tetramethylene glycol or hexamethylene glycol. Two or more kinds of the above glycol components may be used in combination. The above polyester may contain a hydroxycarboxylic acid component such as hydroxybenzoic acid, hydroxynaphthoic acid and β-hydroxyethoxybenzoic acid in addition to the above dicarboxylic acid component and glycol component.

Concretely, a polyester having an aromatic group of a carbon atoms of from 6 to 10 as Ar' and an aliphatic alkyl group of a carbon atoms of from 2 to 4 as R' is preferable, and more concretely a polyester containing an alkylene terephthalate, especially ethylene terephthalate or tetramethylene terephthalate and/or ethylene-2,6-naphthalenedicarboxylate as a main component of the constituent unit (PET, PBT and/or PEN) is especially preferable as the semi-aromatic polyester from the viewpoint of the heat-resistance and cost of the composition of the present invention. The polyester may be used singly or in the form of a combination of two or more kinds in the present invention.

The polyester to be used in the present invention may be produced by conventional production process and there is no particular restriction on the production process. For example, it is produced by the direct esterification of a dicarboxylic acid with a glycol, the transesterification reaction of a dicarboxylic acid ester derivative with a glycol followed by the polycondensation of the product, the polycondensation of a dicarboxylic acid ester derivative composed of a dicarboxylic acid and a glycol, etc.

Concretely, the objective polyester having a desired intrinsic viscosity can be produced by charging the above raw materials into a reactor, subjecting to transesterification reaction or esterification reaction in the presence of a catalyst and carrying out polycondensation of the product in high vacuum in the presence of a catalyst. There is no particular restriction on the catalyst for transesterification reaction and polycondensation, and catalysts used in conventional technique can be used for the purpose. Examples of the transesterification catalyst are titanium, manganese, magnesium, germanium and calcium and those of the polycondensation catalyst are compounds of titanium, niobium, germanium, tin and antimony. Two or more of these substances may be used in combination. The above-mentioned polymerization of the polyester is carried out in the presence of a polyimide.

The intrinsic viscosity of the thermoplastic polyester is preferably 0.2 (dl/g) or above and 5.0 or below, more preferably 0.4 or above and 2.0 or below, and especially preferably 0.4 or above and 1.5 or below.

Thermoplastic Resin Composition

The thermoplastic resin composition of the present invention is produced by blending a crystalline polyimide with a thermoplastic polyester, thereby compatibilizing said polyimide with said polyester at least in molten state. The term "compatibilize" means that said polyimide and said polyester are completely homogeneously miscible at least in molten state by the melting and mixing of the polymers and the molten mixture is transparent by visual observation. The commonly observable incompatible polymer blends show strong optical scattering and are free from transparency. The resin of the present invention produced by to compatibilization exhibits highly homogeneous crystal nuclei formation and growth even in a crystalline phase separation step, does not generate irregular coarse phase separation interface and easily forms a crystal having highly homogeneous and continuous structure as a whole. Such a higher-order structure increases the heat-resistance of the composition of the present invention.

In the composition of the present invention, the mixing weight ratio A:B of the crystalline polyimide (A) to the thermoplastic polyester (B) is preferably within the range of from 0.01:99.99 to 90:10. When the amount of the crystalline polyimide is less than 0.01 part by weight, sufficient addition effect is hardly attainable. On the contrary, the melt viscosity of the thermoplastic resin composition becomes extremely high when the amount of the crystalline polyimide is larger than 90 parts by weight to often cause the difficulty in molding. The ratio is more preferably from 0.5:99.5 to 50:50, further preferably from 1:99 to 30:70. In the case of using an ultra-high molecular weight polyimide, the addition of the polyimide exceeding the above range gives a resin composition having remarkably high melt viscosity and liable to cause difficulty in molding to a film, etc.

It is supposed that when the crystalline polyimide of the present invention, especially a specific polyimide having high melting point and high crystallinity is intimately mixed (blended) with a thermoplastic polyester, these resins form a network structure to improve the flow starting temperature of the composition of the present invention and impart the composition with high heat-resistance. Accordingly, the polyimide crystal is preferably sufficiently crystallized to form a continuous macroscopic structure in the case of using the composition as a heat-resistant molding material. The crystallinity of the polyimide component is improved by the plasticizing effect of the thermoplastic polyester and, accordingly, even a small amount of addition is effective for the improvement of the heat-resistance. However, too much thermoplastic polyester may deteriorate the heat-resistance owing to the dilution effect of the polyimide over the plasticizing effect.

The limit of the heat-resistance depends also upon the combination of the thermoplastic polyester and the polyimide and, if the crystals of the polyimide have no junction point owing to excessive use of the thermoplastic polyester, it is difficult to obtain a resin composition having heat-resistance exceeding that of the thermoplastic polyester. Accordingly, the addition of more than 90 parts by weight of thermoplastic polyester is undesirable and, preferably, the addition amount of the thermoplastic polyester is not more than 70 parts by weight to get sufficiently high soldering heat-resistance. The combination of a thermoplastic polyester with a polyimide also has the effect for improving the elastic modulus, and the ratio of crystalline polyimide (A) to thermoplastic polyester (B) is preferably A:B=10:90 to 90:10 for getting a sufficient effect for improving the elastic modulus.

Namely, the present invention provides a process for the production of a thermoplastic resin composition composed of a crystalline polyimide and a thermoplastic polyester comprising the mixing of said polyimide with said polyester to effect the compatibilization of said polyimide and said polyester at least in molten state.

Any blending method may be used for the production of the composition of the present invention. The first example of the production process is the kneading or mixing of separately produced crystalline polyimide and thermoplastic polyester in molten state to form a thermoplastic resin composition containing said polyimide and said polyester in compatibilized state at least in molten state. The process can be carried out by melting the polymers with a batch-type melting apparatus and kneading or mixing the molten polymers or melting the polymers under the application of shearing force with an extruder, etc. As an alternative, said polyimide and said polyester are dissolved and mixed in the presence of a solvent, however, the kneading of the polymers in molten state is preferable.

The second example of the process for the production of the composition of the present invention is characterized by the polymerization of a thermoplastic polyester in the presence of a crystalline polyimide to obtain a thermoplastic resin composition composed of said polyimide and said polyester and containing said polyimide and said polyester in compatibilized state at least in molten state.

Especially in the second process of the present invention, (1) a step to uniformly melt the system under normal pressure at (the melting point of said polyimide minus 40° C.) or above and 300° C. or below and (2) a step to carry out the polymerization by evacuating the system are preferably included in the production process to facilitate the mixing of a crystalline polyimide having high melting point with a thermoplastic polyester and, above all, the polymerization of polyester is carried out preferably in the presence of a crystalline polyimide having a melting point of 280 to 340° C. Since a crystalline polyimide having high polymerization degree has high melt viscosity and sufficient kneadability is sometimes unattainable by conventional; melt blending, it is especially preferable to carry out the polymerization of a polyester in the presence of a polyimide and the melt-kneading of a semi-aromatic polyester with the resin composition produced by the polymerization of polyester in the presence of a polyimide.

When the crystalline polyimide of the present invention is a crystalline polyimide having high polymerization degree, the blending weight ratio of the crystalline polyimide (A) having high polymerization degree to the thermoplastic polyester (B) is preferably A:B=0.01:99.99 to 40:60 to secure the melt moldability while improving the mechanical characteristics of the blend of the crystalline polyimide having high polymerization degree and the thermoplastic polyester. More preferably, the blending weight ratio is 0.1:95 to 30:70.

In consideration of the melt-moldability of the thermoplastic resin composition of the present invention, sufficient fluidity is hardly attainable and the melt-molding is often extremely difficult when the melt viscosity of said composition, especially a polymer blend of a crystalline polyimide having high polymerization degree and a thermoplastic polyester is 50,000 poise or over. Accordingly, the melt viscosity of the composition of the present invention is preferably 50,000 poise or below, more preferably 5,000 poise or below.

The crystalline polyimide of the present invention, especially a crystalline polyimide having high polymerization degree is extremely useful as a modifier for improving the mechanical characteristics of thermoplastic polyesters. For example, PEN which is a thermoplastic polyester often exhibits low impact resistance or delamination defect in the form of a molded article such as bottle for drink and film. Accordingly, it is especially desirable to remarkably improve the mechanical characteristics of PEN by using a crystalline polyimide having high polymerization degree as a modifier.

Especially a thermoplastic polyester including PET exhibits an unknown phase behavior to be miscible with said polyimide in molten state and preferentially crystallize the polyimide quickly in cooling. A polymer alloy containing ultrafine crystals in uniformly distributed state and having high uniformity can be produced owing to the above phase behavior by the molding of the composition of the present invention e.g. by injection molding. The structure is different from a heterogeneous structure containing coarse phase-separated domains generally observable in incompatible polymer blend. The effect is completely unchanged or becomes more remarkable by the addition of fillers and additives such as glass fiber to enable the production of a molded article having a heat distortion temperature exceeding the melting point of the thermoplastic polyester even in the case of a thermoplastic resin composition containing a semi-aromatic polyester in an amount essentially exceeding the amount of the polyimide.

In the present invention, a fibrous filler, an additive, etc., may be compounded as necessary in the mixing (blending) of the above polymers.

The fibrous filler has functions to improve the mechanical strength of the composition of the present invention and impart the composition with heat-resistance. Various fibrous materials including heat-resistant organic materials and inorganic materials can be used as the fibrous filler, and the addition of such fibrous filler is effective for remarkably improving the heat distortion temperature of the composition and imparting the composition with high heat-deformation resistance (heat-resistance).

The fibrous filler suitable for the use in the present invention usually has an aspect ratio of 10 or more. The aspect ratio is the ratio of the length to the diameter of the fiber. When the aspect ratio of the fiber has distribution, the average value is defined as the aspect ratio of the fibrous filler. Above all, fibers having an average fiber diameter of 0.5 to 20 $\mu$m and an average fiber length of 0.5 to 30 mm are preferably used in the present invention. These fibers may be ground and used in the form of milled fiber.

Examples of such fibrous fillers are glass fiber, metallic fiber, carbon fiber, aramid fiber, ceramic fiber, silicon carbide fiber, potassium titanate whisker and asbestos. Glass fiber is especially preferable among the above examples owing to its economical merit and excellent heat-resistance of a thermoplastic resin composition filled with the filler. The glass fiber may be coated with a surface-treating agent such as coupling agent and sizing agent.

Any process can be adopted in the mixing of the crystalline polyimide of the present invention with the fibrous filler provided that the process contains the molten state of the polyimide. For example, the polyimide is mixed with the filler in molten state with an extruder or melted and kneaded in a melting vessel.

A proper amount of the fibrous filler is used for imparting the resin with heat-resistance and strength. Sufficient strength cannot be attained when the amount is too little and excessive use of the filler deteriorates the moldability. Accordingly, the filler can be used in an amount of 1 to 70% by weight based on the total thermoplastic resin composition (thermoplastic resin composition including the filler). The amount is preferably between 25% by weight and 65% by weight.

A polyimide resin composition having excellent heat-resistance and mechanical characteristics can be produced also in the case of using the crystalline polyimide of the present invention in place of the above composition, i.e. in the case of a polyimide resin composition produced by mixing the crystalline polyimide of the present invention with a fibrous filler.

A polyimide similar to the above-mentioned preferable crystalline polyimide can be used as the crystalline polyimide of the above case. Suitable kind of the fibrous filler and weight ratio of the crystalline polyimide to the fibrous filler are, for example, those similar to the fibrous filler of the present invention and the weight ratio of the thermoplastic resin composition to the fibrous filler.

The composition of the present invention preferably has an intrinsic viscosity of 0.2 (dl/g) or above. When the intrinsic viscosity is smaller than 0.2, the mechanical properties of the molded article such as the polyester film become insufficient. The value is more preferably 0.25 or above, especially preferably 0.3 or above. Although there is no particular restriction on the upper limit, it is practically about 4 or below, preferably 3 or below taking consideration of the moldability, etc.

The heat distortion temperature of the composition of the present invention is preferably 150° C. or above, especially 200° C. or above and further preferably 250° C. or above. A composition having a heat distortion temperature below the above limit is difficult to be suitably used in heat-resistant use. For example, a composition having a heat distortion temperature of 250° C. or above is especially suitably usable as an electronic part for surface-mounting use. Accordingly, the heat distortion temperature is preferably adjusted to 250° C. or above, especially 250 to 350° C. by properly selecting the composition and polymerization degree of the crystalline polyimide of the present invention, mixing ratio of the polyimide to the fibrous filler such as glass fiber, etc.

The composition of the present invention may be incorporated with various non-fibrous additives as necessary. Examples of suitable additives are various fillers such as talc, calcium carbonate, mica, clay, titanium oxide, aluminum oxide, glass flake, metal flake and metal powder, heat-stabilizers represented by phosphoric acid esters and phosphorous acid esters and oxidation stabilizers, light stabilizers, ultraviolet absorbers, lubricants, pigments, flame-retarding agents, flame-retarding assistants, plasticizers and nucleation agents.

Molded Articles

The composition of the present invention can be suitably used in the form of various molded articles by extrusion molding, injection molding, etc., taking advantage of its moldability.

The present invention relates also to a molded article produced by using the above-mentioned composition of the present invention. The term "molded article" means various molded articles such as fiber, film, resin, packaging material and electronic part for surface-mounting. Electronic part for surface-mounting and film are especially preferable among the above molded articles owing to the excellent mechanical properties and heat-resistance of the thermoplastic resin composition of the present invention. Especially in the case of adding a fibrous filler such as glass fiber, molded articles such as electronic part for surface-mounting and heat-resistant container are preferable owing to the excellent effect for improving the heat-resistance and mechanical properties. A molded article for film is a preferable example in the case of a composition free from fibrous filler.

The term "electronic part for surface-mounting" means an electronic part to be soldered on a substrate by surface-mounting method. The surface-mounting method is a method to fix an electronic part by placing the electronic part on a solder printed on a printed circuit board and passing through a heating oven called as reflow oven together with the substrate to melt the solder, in contrast with conventional insertion mounting method to pass the leads of an electronic part through through-holes of a substrate and directly solder the leads (flow soldering or wave soldering) on the face opposite to the mounting face of the electronic part. Since the surface mounting method has various advantages such as the increase of mounting density, mounting to both surfaces and reduction of cost by improved efficiency, it is becoming the mainstream of the soldering method according to the recent tendency of electronic equipment to decrease the size and weight, improve the function and reduce the cost, and its application field is spreading to household electronic appliances such as camera-integrated VTR, electronic calculator, camera, watch, liquid crystal TV, electronic game machine, personal computer and PC card, industrial electronic machines such as miniature computer, office computer, work station, peripheral equipment, terminal equipment and measuring instrument and further to space aeronautic equipment.

The heating of a substrate in a reflow oven in surface mounting is carried out e.g. by the heat-conduction method to heat the substrate placed on a heat-resistant belt moving on a heater, the VPS method to use the latent heat of condensation of a fluorine-based liquid having a boiling point of about 220° C., the hot-air convection heat-transfer method to pass a substrate through a forcibly circulating hot air stream, the far infrared heating method to heat the substrate with far infrared rays from the top or from the top and the bottom, a combination of the hot-air heating and the far infrared heating, etc., and the major trend is the far infrared heating method and the hot-air convection heat-transfer method from the viewpoint of running cost, etc. In contrast with conventional insertion mounting method, the resin material to be used in the electronic parts is subjected to extremely severe condition in these heating methods since these parts are also heated at or above the melting point of the solder.

Concrete examples of the electronic parts for surface mounting are the main body of various connectors, switches, relays, coil bobbins, variable resistors, sockets, plug boards, terminal boards, sensors, resistors, transformers, ICs (integrated circuits), etc., or mainly housings (case, body and cover), frames, electrical insulators, slides (sliders), bases, wafers, rencam, spools, cards, yokes, etc. The present invention aims at resin-made electronic parts to be mounted on a substrate by the above surface mounting method. Among the electronic parts, included in the connectors are a wire-to-wire connector (junction connector), a wire-to-substrate connector and a substrate-to-substrate connector represented by a connector for FFC (Flexible Flat Cable)/FPC (Flexible Printed Circuit), an SIMM socket, a socket for ROM, a connector for interface, a board-in connector and a connector for jumper wire. The type of the connector may be straight type, right angle type, multiple harness type, inject lever type, clip mounting type, bottom entry type, strain relief type, etc., and the connection type may be stack connection, horizontal connection or vertical connection.

The composition of the present invention can be used as a heat-resistant container (molded article) taking advantage of its excellent heat-resistance and elastic modulus. Included in the heat-resistant container are e.g. various servers, food-heating trays, vessel for the heating and transfer of towel, steamed washcloth, etc., baskets, various table wares and ashtrays and these containers can be used in the field necessitating heat-resistance against hot water washing, steam sterilization, etc., which do not restrict the scope of the present invention.

A polyester film having excellent delamination resistance and mechanical strength as well as good color and high transparency can be produced by using the molded article of the present invention. Above all, a biaxially oriented film for photographic film and magnetic recording medium is produced therefrom.

In these cases, the composition of the present invention may be incorporated with additives such as conventional lubricant, pigment, dye, antioxidant, light stabilizer and light shielding agent to an extent not to deteriorate the transparency, surface flatness and thermal stability of the film.

Lubricant

The composition of the present invention may be imparted with slipperiness according to the use. Conventional means can be used as a means for imparting slipperiness such as the dispersion of lubricant particles in the polymer and the application of a slippery layer on the surface of the film.

The method for dispersing the lubricant particles in the polymer is carried out e.g. by adding particles of $SiO_2$, $BaSO_4$, $CaCO_3$, aluminosilicate or crosslinked organic material into a polymer or by precipitating catalyst residue, etc., in the polymerization of the polyester. The addition of lubricant particles to the polymer is preferable because of remarkable slipperiness imparting effect.

Especially preferable method is the addition of lubricant particles having refractive index close to that of the polyester and/or the resin composition of the film, e.g. $BaSO_4$, aluminosilicate or crosslinked organic particles (e.g. crosslinked polystyrene particles). The slipperiness can be effectively imparted by this method while keeping high transparency of the film.

The application of a slippery layer on the surface of the film is preferably carried out by laminating a thin layer containing lubricant particles on at least one surface of a polyester film essentially free from lubricant particle. A film having good slipperiness and transparency can be produced by this method. The lamination is preferably carried out by the coextrusion using a combination of plural extruders, feed blocks and multiple manifolds.

Thickness

The thickness of the film of the present invention and a biaxially oriented film derived therefrom can be selected according to the use of the film.

Young's Modulus

In the present invention, the biaxially oriented film preferably has a Young's modulus of 500 kg/mm$^2$ or above in both longitudinal and lateral directions from the viewpoint of mechanical strength. A film having a Young's modulus of smaller than 500 kg/mm$^2$ has improved delamination resistance, however, it is not preferable because of the possible loss of the film strength.

Film Production Process

The film of the present invention can be produced by conventional process for the production of a polyester film and there is no particular restriction on the process. For example, it can be produced by melting the composition (and semi-aromatic polyester) of the present invention with an extruder, extruding in the form of a sheet, cooling with a cooling drum to obtain an undrawn film, biaxially drawing the undrawn film, heat-setting the product and optionally subjecting the film to relaxed heat-treatment. The properties of the film such as surface characteristics, density and heat shrinkage are dependent upon the drawing condition and other production conditions and, accordingly, the conditions are properly selected at need in the production of the film. As a thermoplastic polyester used in this case, polyethylene terephthalate (PET), polyethylene-2,6-naphthalene dicarboxylate (PEN) may be mentioned as a preferable polyester. As the crystalline polyimide a polyimide represented by the formula (1) wherein $Ar_1$ an aromatic group selected from the formula (1-a) and $R_1$ is —$(CH_2)_n$ (n is an integer of from 6 to 18), and especially a polyimide represented by the formula (1-e), are more preferable.

For example, in the above production process, the resin composition is melted at a temperature between Tm+10° C. and Tm+30° C. (Tm is the melting point of the resin composition), the molten resin composition is extruded to obtain an undrawn film, the film is drawn in one direction (longitudinal or lateral direction) at a temperature between Tg−10° C. and Tg+50° C. (Tg is the glass transition temperature of the resin composition) at a draw ratio of 2 to 6 and the uniaxially drawn film is drawn in the direction perpendicular to the first drawing direction (the second stage drawing direction is lateral when the first stage drawing direction is longitudinal) at a temperature between Tg and Tg+50° C. at a draw ratio of 2 to 6.

The biaxially drawn film is subjected to heat-setting at Tg+60° C. to Tg+20° C. (Tg is the glass transition temperature of the resin composition) for 0.2 to 20 seconds. A film having high transparency and provided with good delamination resistance and curling resistance can be produced when the temperature and the time of the heat-setting operation are within the above ranges.

The biaxially oriented film obtained as above is suitable for photographic film and as base film of magnetic recording medium according to the known method, and accordingly photographic film and magnetic recording medium can be obtained.

EXAMPLES

The present invention is explained by the following Examples, which do not limit the scope of the present invention. The term "parts" in the Examples means "parts by weight" unless otherwise specified.

The definitions of the terms and their determination conditions in the Examples are as follows.

(1) Intrinsic Viscosity ([η]) of the Polymer

Viscosity of the polymer was measured in p-chlorophenol/1,1,2,2-tetrachloroethane mixed solvent (weight ratio, 60/40) at a concentration of 0.5 g/dl at 35° C. and the value calculated by the following formula was used as the intrinsic viscosity.

$[\eta]=(2*(\eta sp-ln\ \eta r))^{0.5}/C$ (in the formula, [η] is intrinsic viscosity, ηsp is specific viscosity, ηr is relative viscosity and C is concentration).

(2) Melt Viscosity

Melt viscosity of the polymer was measured by using a Flow Tester (manufactured by Shimadzu Corp.) at 300° C. and a shearing rate of 1,000 sec$^{-1}$.

(3) Heat-distortion Temperature (° C.)

The heat-distortion temperature was measured in conformity with JIS C2241 under a load of 18.5 Kgf.

(4) Flexural Modulus

Flexural modulus was measured in conformity with JIS K7203.

(5) Izod Impact Strength (Kgf.cm/cm$^2$)

Izod impact strength was measured in conformity with JIS K7110.

(6) Melting Point (Tm(° C.)) and Glass Transition Temperature (Tg(° C.))

These temperatures were measured by using Seiko SSC5200/DSC220 at a heating rate of 20° C./min.

(7) Delamination Whitening Width of Fold (Delamination Resistance)

A film specimen (composed of stacked three sheets) having a size of 40×40 mm was cut out, sandwiched between a pair of flat metal plates while lightly folding into two by hand to form a fold line in TD direction and pressed with a press under a prescribed force (5 kgf/cm$^2$) for 20 seconds. After the above operation, the press was opened and the specimen was left untouched for 1.5 to 2 hours. The film specimen folded into two was returned to the original state by hand and pressed between the above metal plates under a pressure of 2 kgf/cm$^2$ for 20 seconds. The film specimen was taken out of the press, the width w ($\mu$m) of the whitened part at the fold line was measured with a microscope (average of 5 points), and the value w/3 was used as the delamination whitening width of fold. Since whitening take place by delamination, a film having smaller delamination whitening width has better delamination resistance.

(8) Young's Modulus

A film specimen of 10 mm width was set on a tensile tester at a chuck distance of 100 mm and pulled at 23° C. and 50% RH at a pulling rate of 10 mm/min to determine the Young's moduli in machine direction (MD) and transversal direction (TD).

Synthetic Example 1

Polyimide-dodecamethylenediamine.pyromellitic Anhydride: PI-C12.P

Two (2) mol of dodecamethylenediamine was dissolved in a mixed solvent consisting of 3 L of N-methyl-2-pyrrolidone (NMP) and 500 mL of toluene using a reactor furnished with a stirrer, a temperature controlling apparatus and an azeotropic dehydration column, 2 mol of pyromellitic anhydride was added to the solution in nitrogen stream and the mixture was gradually heated from room temperature. The azeotropic distillation of toluene and water formed by the reaction began at 140 to 165° C., and the reaction was finished after about 3 hours to obtain a powdery polyimide (PI-C12.P) ([η]=1.1 (dl/g)).

Synthetic Example 2

Polyimide-decamethylenediamine.hexamethylenediamine.pyromellitic Anhydride: PI-C10.6.P The process of the Synthetic Example 1 was repeated except for the use of 1.5 mol of decamethylenediamine and 0.5 mol of hexamethylene-diamine in place of 2 mol of dodecamethylenediamine to obtain a powdery polyimide (PI-C10.6.P) ([η]=0.97 (dl/g)).

Synthetic Example 3

Polyimide-nonanediamine.pyromellitic Anhydride: PI-C9.P

The process of the Synthetic Example 1 was repeated except for the use of 2 mol of nonanediamine in place of 2 mol of dodecamethylenediamine to obtain a powdery polyimide (PI-C9.P) ([η]=0.81 (dl/g)).

Synthetic Example 4

Polyimide Having Medium Polymerization Degree-dodecamethylene-diamine.pyromellitic Anhydride: PI-C12.P A mixed solvent consisting of 2.5 kg of NMP and 0.75 kg of toluene was charged with 200.37 g (1.0 mol) of 1,12-dodecamethylenediamine in a reactor furnished with a stirrer, a temperature controlling apparatus and an azeotropic dehydration column in nitrogen atmosphere to effect the dissolution of the diamine. The solution was conditioned to 25° C., added with 218.12 g (1.0 mol) of pyromellitic anhydride and reacted for 0.5 hour to obtain a polyamic acid solution. The obtained solution was heated to 120° C., stirred for 2 hours in nitrogen atmosphere, and heated to 150° C. to remove water by the azeotropic reflux of toluene/water. After completing the reaction, the precipitate in the reaction liquid was separated by filtration, washed with acetone, washed twice with water (80° C.), washed again with acetone and dried at 120° C. to obtain 375 g of polyimide (PI-C12.P) ([η]=1.6 (dl/g), melting point: 295.5° C.).

Synthetic Example 5

Polyimide Having High Polymerization Degree-dodecamethylenediamine.pyromellitic Anhydride : PI-C12.P A reactor furnished with a stirrer, a nitrogen, gas inlet and a nitrogen gas outlet is charged with 130 g of the polyimide produced by the Synthetic Example 4 and having low polymerization degree and the polymer was subjected to solid phase polymerization in normal pressure nitrogen atmosphere (nitrogen gas flow rate: 2 L/min) in powdery form at 260° C. The intrinsic viscosity values (dl/g) and the melting points (° C.) of the polyimide having high polymerization degree (PI-C12.P) at various solid phase polymerization times were shown in Table 1 and Table 2, respectively.

Synthetic Example 6

Polyimide Having High Polymerization Degree-dodecamethylenediamine.pyromellitic Anhydride: PI-C12.P The process of the Synthetic Example 5 was repeated under the same conditions except for the use of melt-heat treatment in normal pressure nitrogen atmosphere (nitrogen gas flow rate: 2 L/min) at 280° C. The intrinsic viscosity values (dl/g) and the melting points (° C.) of the polyimide having high polymerization degree (PI-C12.P) at various solid phase polymerization times were shown in Table 1 and Table 2, respectively.

TABLE 1

| Solid phase polymerization temperature (° C.) | Nitrogen gas flow rate (L/min) | Intrinsic viscosity ([η]) of crystalline polyimide at each solid phase polymerization time | | | | |
|---|---|---|---|---|---|---|
| | | 0 hr | 2 hr | 4 hr | 8 hr | 12 hr |
| Synthetic Example 5 | 260 | 2.0 | 1.785 | 4.99 | 6.27 | 7.48 | 8.23 |
| Synthetic Example 6 | 280 | 2.0 | 1.785 | 6.48 | 7.38 | 8.23 | — |

TABLE 2

| Solid phase polymerization temperature (° C.) | Nitrogen gas flow rate (L/min) | Melting point of crystalline polyimide at each solid phase polymerization time (° C.) | | | | |
|---|---|---|---|---|---|---|
| | | 0 hr | 2 hr | 4 hr | 8 hr | 12 hr |
| Synthetic Example 5 | 260 | 2.0 | 293.0 | 295.6 | 295.6 | 296.6 | 297.1 |
| Synthetic Example 6 | 280 | 2.0 | 293.0 | 295.7 | 296.3 | 297.3 | — |

Synthetic Example 7

Polyimide-dodecamethylenediamine.decamethylenediamine.pyromellitic Anhydride: PI-C12.10.P A mixed solvent consisting of 270 ml of NMP and 900 ml of toluene was charged with 0.35 mol of 1,12-dodecamethylenediamine and 0.35 mol of 1,10-decamethylenediamine in a reactor furnished with a stirrer, a temperature controlling apparatus and an azeotropic dehydration column in nitrogen atmosphere and the system was heated to 60° C. to effect the dissolution of the diamines. The solution was added with 0.75 mol of pyromellitic anhydride and slowly heated. The azeotropic distillation of toluene and water formed by the reaction began at 140 to 160° C., and the reaction was completed after about 3 to 4 hours to obtain a powdery polyimide (PI-C12.10.P) ([η]=2.53 (dl/g), melting point: 279.3° C.).

Example 1

PI-C12.P/polyethylene Terephthalate (PET)

A thermoplastic resin composition was produced by melting and kneading 30 parts of the polyimide (PI-C12.P) obtained by the Synthetic Example 1 and 70 parts of a PET (intrinsic viscosity [η]=0.57) with a 30 mm φ coaxial rotary twin-screw extruder (manufactured by Ikegai Corp., PCM30) at a polymer temperature of 320° C. and an average retention time of 5 minutes. A molded plate having a size of 120 mm×12 mm×3 mm was produced by mixing 60 parts of chips obtained by crushing the thermoplastic resin composition (crushed chip) with 40 parts of glass fiber (manufactured by Asahi Fiber Glass Co., "Glasslon" chopped strand, fiber length 3 mm, aspect ratio 230) and molding the mixture with an injection molding machine at a cylinder temperature of 280 to 320° C. and a mold temperature of 40° C. The injection molding was easy and the moldability was good.

The heat-distortion temperature of the molded product was 263° C. and the flexural modulus was 108.9 MPa (1111.3 Kgf/cm$^2$).

Example 2

PI-C12.P/PET

A molded plate was produced by a method similar to the Example 1 except for the use of 10 parts of the polyimide and 90 parts of the PET. The injection molding was easy and the moldability was good.

The heat-distortion temperature of the molded product was 257° C. and the flexural modulus was 93.1 MPa (950 Kgf/cm$^2$).

Comparative Example 1

PI-C12.P

A molded plate was produced by a method similar the Example 1 except for the exclusive use of 60 parts by weight of the polyimide.

The heat-distortion temperature of the molded article was higher than 300° C., however, the flexural modulus was 92.6 MPa (945.0 Kgf/cm$^2$).

Comparative Example 2

PET

A molded plate was produced by a method similar to the Example 1 except for the exclusive use of 60 parts by weight of PET chips.

The heat-distortion temperature of the molded product was 86° C. and the flexural modulus was 89.0 MPa (907.7 Kgf/cm$^2$).

The results of the Examples 1 and 2 and the Comparative Examples 1 and 2 are collectively shown in the Table 3.

TABLE 3

| | Polyimide | | | | | | PI: PES | Polymer: filler | Heat distortion temp. (° C.) | Elastic modulus (MPa) |
|---|---|---|---|---|---|---|---|---|---|---|
| | C6 | C9 | C10 | C12 | P | PES | | | | |
| Example 1 | — | — | — | 9 | 2.0 | PET | 30:70 | 60:40 | 263 | 108.9 |
| Example 2 | — | — | — | 2.0 | 2.0 | PET | 10:90 | 60:40 | 257 | 93.1 |
| Comparative Example 1 | — | — | — | 2.0 | 2.0 | — | 100:0 | 60:40 | >300 | 92.6 |
| Comparative Example 2 | — | — | — | — | — | PET | 0:100 | 60:40 | 86 | 89.0 |

Note:

TABLE 3-continued

| | Polyimide | | | | | PI: | Polymer: | Heat distortion | Elastic modulus |
|---|---|---|---|---|---|---|---|---|---|
| C6 | C9 | C10 | C12 | P | PES | PES | filler | temp. (° C.) | (MPa) |

PI: Polyimide,
PES: Polyester,
C6: Hexamethylenediamine,
C9: Nonanediamine,
C10: Decamethylenediamine,
C12: Dodecamethylenediamine,
PET: Polyethylene terephthalate

Example 3

PI-C10.6.P/PET

A molded plate was produced by a method similar to the Example 1 except for the use of a polyimide obtained by the Synthetic Example 2. The injection molding was easy and the moldability was good.

The heat-distortion temperature of the molded product was 262° C. and the flexural modulus was 103.5 MPa (1055.7 Kgf/mm$^2$).

Example 4

PI-C10.6.P/PET

A molded plate was produced by a method similar to the Example 3 except for the use of 50 parts of polyimide and 50 parts of PET. The injection molding was easy and the moldability was good.

The heat-distortion temperature of the molded product was 272° C. and the flexural modulus was 97.2 MPa (991.5 Kgf/mm$^2$).

Example 5

PI-C9.P/PET

A molded plate was produced by a method similar to the Example 3 except for the use of 30 parts of polyimide obtained by Synthetic Example 3 and 70 parts of PET. The injection molding was easy and the moldability was good.

The heat-distortion temperature of the molded product was 254° C. and the flexural modulus was 104.8 MPa (1069.5 Kgf/mm$^2$). The results of these Examples 3 to 5 are collectively shown in the Table 4.

TABLE 4

| | Polyimide | | | | | PI: | Polymer: | Heat distortion | Elastic modulus |
|---|---|---|---|---|---|---|---|---|---|
| | C6 | C9 | C10 | C12 | P | PES | PES | filler | temp. (° C.) | (MPa) |
| Example 3 | 0.5 | — | 1.5 | — | 2.0 | PET | 30:70 | 60:40 | 262 | 103.5 |
| Example 4 | 0.5 | — | 1.5 | — | 2.0 | PET | 50:50 | 60:40 | 272 | 97.2 |
| Example 5 | — | 2.0 | — | — | 2.0 | PET | 30:70 | 60:40 | 254 | 104.8 |

Note:
The meanings of PI, PES, C6, C9, C10, C12, PET, etc., are same as those described in the note of the Table 3.

Referential Examples 1 to 4

PI-C10.6.P, PI-C9.P

Injection molding was carried out in a manner similar to the Example 1 using 60 parts by weight of crushed chips obtained by melting respective polyimides of the Examples 4 and 5 (Synthetic Example 2 and Synthetic Example 3) and 40 parts by weight of glass fiber of the Example 1. The injection molding was easy in the Referential Examples 1 and 2 and the molded articles had good forms. Both of these molded articles had heat-distortion temperature of 300° C. or above and the flexural moduli were about 90 MPa (926 Kgf/mm$^2$) (Referential Example 1) and 100.8 MPa (1028.9 Kgf/mm$^2$) (Referential Example 2). The moldability was good in the Referential Examples 3 and 4 free from glass fiber, both of the molded articles had heat-distortion temperature of lower than 200° C., and the flexural moduli were 17.6 MPa (180 Kgf/mm$^2$) (Referential Example 3) and 21.7 MPa (221 Kgf/mm$^2$) (Referential Example 4). These results are collectively shown in the Table 5.

TABLE 5

|  | PI | | | | Polymer: filler | Heat distortion temp. (° C.) | Elastic modulus (MPa) |
| --- | --- | --- | --- | --- | --- | --- | --- |
|  | C6 | C9 | C10 | C12 | P | | | |
| Referential Example 1 | 0.5 | — | 1.5 | — | 2.0 | 60:40 | >300 | about 90 |
| Referential Example 2 | — | 2.0 | — | — | 2.0 | 60:40 | >300 | 100.8 |
| Referential Example 3 | 0.5 | — | 1.5 | — | 2.0 | 100:0 | <200 | 17.6 |
| Referential Example 4 | — | 2.0 | — | — | 2.0 | 100:0 | <200 | 21.7 |

Note:
The meanings of PI, C6, C9, C10, C12, etc., are same as those described in the note of the Table 3.

Example 8

PI-C10.12.P/PET

Thirty (30) parts by weight of the polyimide obtained by the Synthetic Example 7 and 70 parts by weight of polyethylene-2,6-naphthalate (PEN) were blended by using a 30 mm φ coaxial rotary twin-screw extruder (manufactured by Ikegai Corp., PCM30) at a polymer temperature of 305° C. and an average retention time of 5 minutes and the blended resin was pelletized. A molded plate having a size of 64 mm×12.7 mm×3.2 mm was produced by molding the pellets with an injection molding machine at a cylinder temperature of 305° C. and a mold temperature of 25° C.

The Izod impact strength of the molded product was 3.3 kgf -cm/cm$^2$. The melt viscosity of the thermoplastic resin composition consisting of 30 parts by weight of the polyimide and 70 parts by weight of PEN was 4,200 poise.

Example 9

PI-C10.OP

A polyamic acid solution was produced according to the Synthetic Example 7 except for the use of 23 kg of NMP and 23 mol of 1,10-decanediamine in place of toluene and dodecamethylenediamine, adding 23 mol of 4,4'-hydroxydiphthalic acid dianhydride in place of pyromellitic anhydride and reacting for 24 hours. The temperature of the reaction liquid was increased to 88° C. by the heat of reaction. The polyamic acid solution was added with 50 mol of acetic anhydride and 50 mol of pyridine and subjected to chemical cyclization in nitrogen atmosphere under stirring at 45° C. for 3 hours. The obtained polyimide solution was reprecipitated with a reprecipitation apparatus furnished with a stirrer using water as the poor solvent and the precipitate was washed with water and dried to obtain a polyimide (PI-C10OP) ([η]=0.60 (dl/g), melting point 157.2° C.).

Thirty (30) parts by weight of the polyimide and 70 parts by weight of PEN were blended with a 30 mm φ coaxial rotary twin-screw extruder (manufactured by Ikegai. Corp., PCM30) at a polymer temperature of 305° C. and an average retention time of 5 minutes and the blended composition was pelletized. A molded plate having a size of 64 mm×12.7 mm×3.2 mm was produced by the injection molding of the resin with an injection molding machine at a cylinder temperature of 305° C. and a mold temperature of 25° C.

The Izod impact strength of the molded product was 2.2 kgf.cm/cm$^2$ and the melt viscosity of the thermoplastic resin composition consisting of 30 parts by weight of the polyimide and 70 parts by weight of PEN was 2,500 poise.

Comparative Example 3

PEN

A molded plate having a size of 64 mm×12.7 mm×3.2 mm was produced by molding a PEN ([η]=0.72 (dl/g)) with an injection molding machine at a cylinder temperature of 305° C. and a mold temperature of 25° C.

The Izod impact strength of the molded product was 2.4 kgf.cm/cm$^2$ and the melt viscosity of the PEN was 3,500 poise.

Example 10

PI-C10.12/PET

A reactor furnished with a stirring device and a vacuum distillation system was charged with 10.98 g (0.045 mol) of 2,6-naphthalenedicarboxylic acid dimethyl ester, 5.86 g (0.0945 mol) of ethylene glycol, 0.668 g of the polyimide obtained by the Synthetic Example 4 and 4.6 mg (0.0135 mmol) of tetrabutyl titanate, transesterification reaction was performed in nitrogen atmosphere under normal pressure at 200° C. for 30 minutes, and the reaction product was heated to 290° C. under normal pressure and stirred for 15 minutes. The polyester oligomer and the polyimide were homogeneously mixed by this process to give a transparent molten liquid. The product was heated to 300° C. under a pressure of 200 mmHg and to 310° C. under a pressure of 100 mmHg and polymerized at 310° C. under 20 mmHg pressure for 15 minutes and then under 0.3 mmHg pressure for 30 minutes.

The obtained thermoplastic resin composition ([η]=0.902 (dl/g), Tm=262.7° C., Tg=112.9° C.) composed of the polyimide and PEN was transparent revealing excellent compatibility of both polymers.

Comparative Example 4

PI-C12.P/PEN

In the Example 10, the system was heated to 240° C. after the transesterification reaction, stirred for 15 minutes under normal pressure and then for 15 minutes under a pressure of 20 mmHg, heated to 290° C. under a pressure of 200 mmHg and polymerized for 15 minutes under 200 mmHg pressure, for 15 minutes under 20 mmHg pressure and then for 30 minutes under 0.3 mmHg pressure.

The polyimide remained in undissolved state and a homogeneous thermoplastic resin composition consisting of polyimide and PEN was not produced.

Example 11

Electronic Part

A box connector having dimensions of 30 mm×5 mm×5 mm and a wall thickness of 0.4 mm was molded at a mold temperature of 40° C. using the thermoplastic resin composition produced by the Example 3.

The connector was (before inserting a pin) immersed in a solder bath at 250° C. for about 20 seconds, taken out of the bath and observed. There was absolutely no partial melt, blister, deformation, etc., on the surface and the product was sufficiently suitable as a part for surface mounting.

A connector molded from the resin composition obtained by the Referential Example 1 by the same molding method had good physical properties similar to the above case and was sufficiently suitable as a part for surface mounting.

Example 12

Film

An undrawn film was produced by drying the pellets of the composition of the Example 10 at 180° C. for 3 hours, supplying to the hopper of an extruder, melting at 300° C. and extruding through a slit die having a slit gap of 1.3 mm on a rotary cooling drum having a surface temperature of 40° C. The produced undrawn film was preheated to 120° C., heated with an IR heater of 900° C. placed 15 mm above the film between a low-speed roll and a high-speed roll and drawn in longitudinal direction at a draw ratio of 3.6. The uniaxially drawn film was supplied to a tenter and drawn in lateral direction at 140° C. at a draw ratio of 5.0. The biaxially oriented film was subjected to heat-setting at 210° C. for 5 seconds to obtain a polyimide/polyethylene naphthalate film having a thickness of 4.5 μm. The characteristics of the obtained film are shown in the Table 6.

Comparative Example 5

Film

A biaxially oriented film was produced by a method similar to the Example 11 provided that the polyethylene-2,6-naphthalate film was produced by using 100 parts of naphthalene-2,6-dicarboxylic acid dimethyl ester without adding an ultra-high molecular weight polyimide. The characteristics of the obtained film are shown in the Table 6.

TABLE 6

| | Film thickness (μm) | Intrinsic viscosity | Tg (° C.) | Delamination whitening width (μm/sheet) | Young's modulus MD/TD (kg/mm²) |
|---|---|---|---|---|---|
| Example 12 | 4.6 | 0.486 | 117 | 15.6 | 562/902 |
| Comparative Example 5 | 4.5 | 0.513 | 121 | 18.0 | 616/877 |

It is obvious from the Table 6 that the film of the present invention has excellent delamination resistance and mechanical strength. Accordingly, the biaxially oriented film is suitable for the use as a biaxially oriented film for photographic film, a base film for magnetic recording medium, etc.

What is claimed is:

1. A thermoplasic resin composition containing a crystalline polyimide and a thermoplastic polyester characterized in that said polyimide and said polyester are compatibilized at least in molten state, wherein said polyimide is composed mainly of the repeating unit expressed by the formula (1),

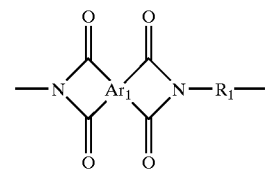

(1)

(in the formula, $R_1$ is an aliphatic alkylene group expressed by $-(CH_2)_n-$ (in the formula, n is an integer of from 6 to 18) and optionally containing substituents, and $Ar_1$ is a group derived from pyromellitic anhydride and expressed by the following formula (1-d)),

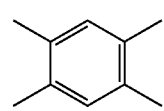

(I-d)

2. The thermoplastic resin composition of claim 1 wherein $R_1$ is an aliphatic alkylene group expressed by $-(CH_2)_n-$ (in the formula, n is an integer of from 9 to 12).

3. The thermoplastic resin composition of claim 1 wherein said polyimide has an intrinsic viscosity ([η]) of 0.5 (dl/g) or above and 15 or below.

4. The thermoplastic resin composition of claim 1 wherein said polyimide has an intrinsic viscosity ([η]) of 0.5 (dl/g) or above and smaller than 2.5.

5. The thermoplastic resin composition of claim 1 wherein said polyimide has an intrinsic viscosity ([η]) of 2.5 (dl/g) or above and 15 or below.

6. The thermoplastic resin composition of claim 1 wherein said polyester has a melting point lower than the melting point of said polyimide or said polyester is an amorphous polyester.

7. The thermoplastic resin composition of claim 1 wherein said polyester is a polyester composed mainly of a semi-aromatic ester expressed by the formula (2)

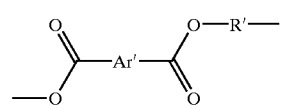

(2)

(in the formula, Ar' is an aromatic group having a carbon number of 6 to 18, optionally containing substituents, and R' is an aliphatic group having a carbon number of 2 to 20 and optionally containing substituents).

8. The thermoplastic resin composition of claim 7 wherein Ar' is an aromatic group having a carbon number of 6 to 10 and R' is an aliphatic alkylene group having a carbon number of 2 to 4.

9. The thermoplastic resin composition of claim 1 wherein said polyester is polyethylene terephthalate or polybutylene terephthalate.

10. The thermoplastic resin composition of claim 1 wherein said polyester is polyethylene-2,6-naphthalenedicarboxylate.

11. The thermoplastic resin composition of claim 1 wherein a fibrous filler is mixed to the composition.

12. The thermoplastic resin composition of claim 11 wherein said fibrous filler is glass fiber.

13. The thermoplastic resin composition of claim 11 or claim 12 wherein the content of said fibrous filler is 1 to 70% by weight based on the total thermoplastic resin composition.

14. The thermoplastic resin composition of claim 1 wherein the compounding weight ratio of said polyimide (A) to said polyester (B) (A:B) is within the range of 0.01:99.99 to 90:10.

15. The thermoplastic resin composition of claim 1 having a melt viscosity of 50,000 poise or below at 300° C.

16. The thermoplastic resin composition of claim 1 having a heat-distortion temperature of 150° C. or below.

17. A molded article made of the thermoplastic resin composition claim 1.

18. The molded article of claim 17 comprising an electronic part for surface mounting.

19. The molded article of claim 17 comprising a film.

20. A biaxially oriented film produced by the biaxial drawing of the film of claim 19.

21. The biaxially oriented film of claim 20 having Young's modulus of 500 kg/mm$^2$ or above in each orientation direction of the film.

22. The biaxially oriented film of claim 20 or 21 wherein said thermoplastic polyester is polyethylene naphthalate or polyethylene-2,6-naphthalenedicarboxylate.

23. A photographic film produced by using the biaxially oriented film of claim 22 as the base film.

24. A magnetic recording medium produced by using the biaxially oriented film of claim 22 as the base film.

* * * * *